US008213996B2

(12) United States Patent
Shim et al.

(10) Patent No.: US 8,213,996 B2
(45) Date of Patent: Jul. 3, 2012

(54) TERMINAL AND DISPLAY METHOD USED IN THE TERMINAL

(75) Inventors: Jung-hyun Shim, Seongnam-si (KR); Stanley Chung, Seoul (KR); Sang-ryong Kim, Yongin-si (KR); Chang-su Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 906 days.

(21) Appl. No.: 11/892,534

(22) Filed: Aug. 23, 2007

(65) Prior Publication Data
US 2008/0081673 A1   Apr. 3, 2008

(30) Foreign Application Priority Data

Oct. 2, 2006   (KR) .................. 10-2006-0097411

(51) Int. Cl.
*H04M 1/00* (2006.01)
*H04B 1/38* (2006.01)

(52) U.S. Cl. ...................................... 455/566; 715/788

(58) Field of Classification Search ............... 455/550.1, 455/556.2, 563, 566; 345/588, 674, 162, 345/902, 173; 715/788, 789
See application file for complete search history.

(56) References Cited

U.S. PATENT DOCUMENTS

| 5,673,405 A | 9/1997 | Tange ........................... 395/348 |
| 7,429,988 B2* | 9/2008 | Gonsalves et al. ............ 345/472 |
| 2002/0080188 A1* | 6/2002 | Somashekaraiah ........... 345/810 |
| 2005/0044508 A1* | 2/2005 | Stockton ....................... 715/811 |
| 2006/0080386 A1* | 4/2006 | Roykkee et al. .............. 709/203 |

FOREIGN PATENT DOCUMENTS

| CN | 03147264 | 1/2005 |
| KR | 10-2005-0011049 | 1/2005 |
| KR | 10-2005-0074063 | 7/2005 |
| WO | 2006/037545 | 4/2006 |

OTHER PUBLICATIONS

Office Action dated Oct. 24, 2007 in corresponding Korean Patent Application No. 10-2006-0097411 (4 pages).
International Search Report and Written Opinion dated Dec. 5, 2007 in International Application No. PCT/KR2007/004246 (10 pages).
Chinese Office Action dated Oct. 8, 2010 issued in corresponding Chinese Patent Application No. 200780036829.5.
European Search Report for related European Application No. 07808044.7, mailed May 9, 2012.

* cited by examiner

*Primary Examiner* — Ping Hsieh
(74) *Attorney, Agent, or Firm* — Staas & Halsey LLP (57) ABSTRACT

Provided is a terminal and a display method used in the terminal capable of analyzing images that are mainly selected by a user from among images to be displayed by the terminal and firstly displaying the selected images, although the terminal needs to display more images than the maximum number of images that the terminal can simultaneously display, so that it is possible to reduce the inconvenience of performing a scrolling operation to select an image.

12 Claims, 6 Drawing Sheets

TERMINAL AND DISPLAY METHOD USED IN THE TERMINAL

CROSS-REFERENCE TO RELATED PATENT APPLICATION

This application claims the benefit of Korean Patent Application No. 10-2006-0097411, filed on Oct. 2, 2006, in the Korean Intellectual Property Office, the disclosure of which is incorporated herein in its entirety by reference.

BACKGROUND OF THE INVENTION

1. Field of the Invention

The present invention relates to a terminal such as a personal digital assistant (PDA), and more particularly, to a terminal having buttons for displaying images and a display method for the terminal.

2. Description of the Related Art

A terminal may be instructed to display more images than the terminal can simultaneously display by default. For example, a user using a terminal having a music reproduction function may want to check music files stored in the terminal, and in this case, the terminal may display the titles of the music files stored therein. If it is assumed, for example, that 20 music files are stored in the terminal and the maximum number of titles that the terminal can simultaneously display is 5, the user manipulates buttons such as direction keys of the terminal to scroll the 20 titles. Similarly, a user using a terminal having various functions such as a call function, a short message service function, a music reproduction function, and a motion picture file reproduction function, may want to check what functions the terminal can perform, and in this case, the terminal displays the functions that can be performed. If it is assumed, for example, that the terminal can perform 6 functions and the number of images that the terminal can simultaneously display is 3, the user manipulates buttons such as the direction keys of the terminal to scroll the 6 functions.

Consequently, if the number of images that the terminal user wants to display increases, and the maximum number of images that the terminal can simultaneously display decreases due to size reduction of the terminal, the user has to perform a scrolling operation that takes longer time. As functions of a plurality of terminals are provided to a single terminal, details of a function become more complex, the user can store more files in the terminal, and the number of images to be displayed on the terminal increases. However, as the size of the terminal becomes smaller, the maximum number of images that the terminal can simultaneously display decreases. Therefore, in view of the current trend for integration of the terminal with high-capacity memory and miniaturization of the terminal, user inconvenience further increases.

SUMMARY OF THE INVENTION

The present invention provides a terminal capable of analyzing images that are mainly selected by a user from among images to be displayed by the terminal and firstly displaying the selected images, although the terminal needs to display more images than the maximum number of images which the terminal can simultaneously display, thereby reducing the user's inconvenience of performing a scrolling operation to select an image.

The present invention also provides a display method capable of analyzing images that are mainly selected by a user from among images to be displayed by a terminal and firstly displaying the selected images, although the terminal needs to display more images than the maximum number of images which the terminal can simultaneously display, thereby reducing the user's inconvenience of performing a scrolling operation to select an image.

The present invention also provides a computer-readable medium having embodied thereon a computer program for performing a display method capable of analyzing images that are mainly selected by a user from among images to be displayed by a terminal and firstly displaying the selected images, although the terminal needs to display more images than the maximum number of images which the terminal can simultaneously display, thereby reducing the user's inconvenience of performing a scrolling operation to select an image.

The attached drawings for illustrating exemplary embodiments of the present invention are referred to in order to gain a sufficient understanding of the present invention, the merits thereof, and the objectives accomplished by the implementation of the present invention.

According to an aspect of the present invention, there is provided a terminal including a display unit arranging a plurality of selectable images in response to an arrangement control signal and displaying at least a part of the plurality of images; and a controller generating the arrangement control signal for arranging the plurality of images according to the analyzed number of repeated selections of each of the plurality of images.

According to another aspect of the present invention, there is provided a display method performed in a terminal, the display method including (a) analyzing the number of repeated selections of each of a plurality of selectable images; and (b) displaying at least a part of the plurality of images to the plurality of the buttons while arranging the plurality of images according to the result of the analyzing.

According to another aspect of the present invention, there is provided a computer readable recording medium having recorded thereon a computer program performing (a) analyzing the number of repeated selections of each of a plurality of selectable images; and (b) displaying at least a part of the plurality of images to the plurality of the buttons while arranging the plurality of images according to the result of the analyzing.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a terminal and a display method used in the terminal according to the present invention will be described in detail with reference to the attached drawings.

Figure 1:
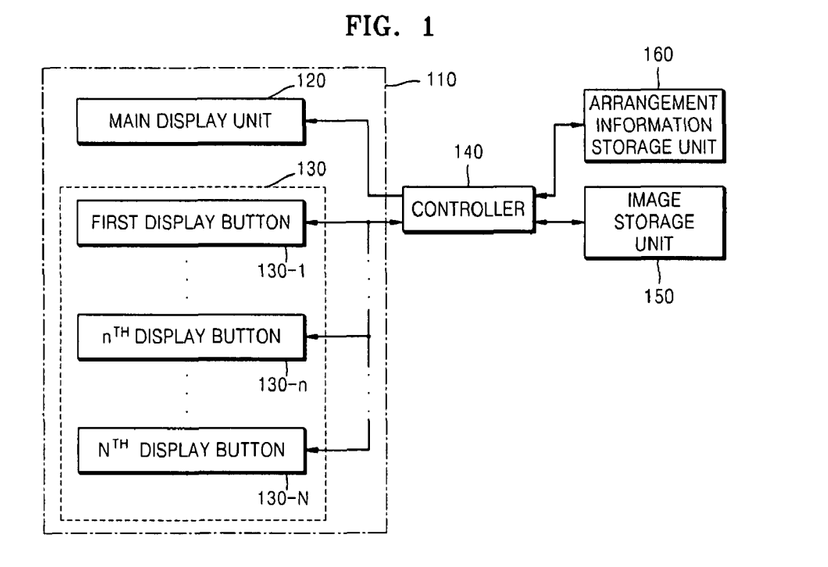
FIG. 1 is a block diagram for explaining a terminal according to an embodiment of the present invention.

FIG. 1 is a block diagram for explaining a terminal according to an embodiment of the present invention. The terminal may include a display unit 110, a controller 140, an image storage unit 150, and an arrangement information storage unit 160. The image storage unit 150 may be included in the terminal or provided in a device externally connected to the terminal though a network.

The display unit 110 may be implemented as one or more display panels (for example, liquid crystal displays (LCDs)) and displays images through the display panels. For the convenience of description, the display unit 110 is assumed to be implemented as a single display panel.

The display unit 110 includes a main display unit 120 and a sub display unit 130. More specifically, a region of the display panel may be divided into two regions, i.e., a first region where the main display unit 120 displays images and a second region where the sub display unit 130 displays images. The first region may be larger than the second region.

For the convenience of description, it is assumed that the terminal has a plurality of buttons 130-1, . . . , 130-$n$, . . . , 130-N (hereinafter, referred to as display buttons) and buttons without a display function (hereinafter, referred to as non-display buttons). Here, n and N are integers and satisfy the condition 1<n<N (where, N is an integer equal to or greater than 2).

In this case, the sub display unit 130 may be integrated with the plurality of the display buttons 130-1, . . . , 130-$n$, . . . , 130-N, that is, the first to N-th display buttons 130-1 to 130-N. Each of the display buttons 130-1 to 130-N has an image display function, and the plurality of the display buttons can display maximum N images.

The display unit 110 may display a plurality of selectable images. For the convenience of description, it is assumed that a plurality of images to be displayed by the display unit 110 are all selectable images.

Image selection is performed by a terminal user.

The user may want to select an image displayed on the main display unit 120. In this case, the user may instruct the selection to the terminal by touching a part of the selected image or manipulating one of the display buttons 130-1 to 130-N. In the present invention, manipulation of a button may mean pressing the button or touching the button.

Hereinafter, for the convenience of description, it is assumed that the image to be selected by the user is one image from among the images displayed by the display buttons 130-1 to 130-N. In this case, the user may instruct the selection to the terminal by manipulating one of the display buttons 130-1 to 130-N on which the selected image is displayed.

The maximum number of images that the display unit 110 can simultaneously display (hereinafter, referred to as the number of simultaneously displayable images) is determined according to the hardware characteristics of the display 110. For example, the number of simultaneously displayable images is N+1. It is already assumed that the main display unit 120 displays a single image at a time.

The number M (M is an integer and M>N) of images to be displayed by the display unit 110 may exceed the number of simultaneously displayable images. This situation may occur frequently due to the high-integration of the terminal with a large capacity memory and the miniaturization of the terminal.

When the number of images to be displayed exceeds the number of simultaneously displayable images, the user may scroll a plurality of the displayable images by manipulating the display buttons 130-1 to 130-N. More specifically, when the display buttons 130-1 to 130-N are arranged in a row, the user slides a finger on the display buttons in one direction (for example, the right direction) or in the opposite direction (for example, the left direction) to scroll all of the plurality of the images to be displayed. To do this, the display buttons 130-1 to 130-N may be include one or more touch sensors.

When the number of the images to be displayed exceeds the number of simultaneously displayable images, the user manipulates the display buttons 130-1 to 130-N to scroll all of the images to be displayed as described above, or manipulates scroll buttons such as direction keys to scroll all of the images to be displayed. The scroll buttons may be non-display buttons (for example, non-display buttons on which arrows are marked) or display buttons (for example, display buttons displaying arrows). Hereinafter, for the convenience of description, it is assumed that the user manipulates scroll buttons to scroll all of the images to be displayed.

The controller 140 generates a display control signal, and the image storage unit 150 stores image data including all images that the display unit 110 can display.

The controller 140 reads image data corresponding to the selected image from the image data stored in the image storage unit 150 and generates the display control signal.

In the current embodiment, the display control signal means a signal for displaying the image(s) corresponding to the read image data. More specifically, the display control signal is a signal for displaying the image(s) corresponding to image data corresponding to the result of manipulating a button with respect to the image data stored in the image storage unit 150. The button may mean one of the display buttons 130-1 to 130-N that is manipulated to select a specific image, or the scroll button.

The result of manipulating the button may mean answers to questions such as which button is manipulated from among the display buttons 130-1 to 130-N and the non-display buttons (particularly, the scroll buttons) and which button was manipulated before a current manipulation. Examples of the result of manipulating the button include 'the third display button 130-3 has been pressed once and the button pressed right before the third display button 130-3 is the second display button 130-2', 'the seventh display button 130-7 has been pressed for more than a second and a button pressed right before the seventh display button 130-7 is the first display button 130-1', and 'an up (↑) direction key has been pressed once and a button pressed right before the up (↑) direction key is also the up (↑) direction key'.

The controller 140 provides the read image data and the generated display control signal to the display unit 110. Correspondingly, the display unit 110 displays a plurality of images corresponding to the read image data in response to the display control signal. Specifically, the main display unit 120 displays one or more images in response to the display control signal, and the display buttons 130-1 to 130-N display a plurality of images (i.e., M images in total) in response to the display control signal. The aforementioned 'a plurality of images to be displayed by the display unit 110' means the plurality of the images to be displayed by the display unit 110 in response to the display control signal.

The plurality of the images to be displayed by the display unit 110 are renewed according to a result of manipulating the buttons whenever the display buttons or the non-display buttons are manipulated.

The display control signal may have information on how the images to be displayed are arranged (hereinafter, referred to as arrangement information). The arrangement information of the display control signal is arrangement information set as default information when the terminal is released on the market.

Therefore, the display unit 110 which operates in response only to the display control signal sequentially arranges the plurality of the images to be displayed. For example, when the number of simultaneously displayable images is 3, and the display control signal instructs 9 images (images a to i) to be arranged in the order of a to i, the display unit 110 always firstly displays the images a, b, and c. In this case, when the user momentarily presses a scroll button (for example, a down (↓) direction key), the display unit 110 displays the images b, c, and d, and when the user momentarily presses the scroll button once again, the display unit 110 displays the images c, d, and e. In this manner, the display unit 110 also can display the images g, h, and i. As described above, the display unit 110 which sequentially arranges a plurality of images to be displayed and displays a part of the images (precisely, images corresponding to the number of sequentially displayable images), requires the user scrolling (for example, in the case of a user who mainly selects the image h).

In order to solve this inconvenience, a construction as follows is provided.

The controller 140 generates an arrangement control signal in addition to the aforementioned display control signal. In the current embodiment, the arrangement control signal is a signal for arranging the images to be displayed by the display unit 110 according to the analyzed number of repeated selections of each of the images. Therefore, the arrangement information is also included in the arrangement control signal. However, the arrangement information included in the arrangement control signal may be different from the arrangement information of the display control signal.

Operations of generating the arrangement control signal by the controller 140 are as follows.

The controller 140 analyzes the number of repeated selections of each of the images to be displayed by the display unit 110. The start and end of the analysis may be ordered by manipulating an analysis order button (not shown) provided in the terminal. For example, the user manipulates the analysis order button (not shown) to instruct the controller 140 to start the analysis, and the user uses the terminal for a week. Thereafter, the user manipulates the analysis order button again to instruct the controller 140 to end the analysis. In this case, the controller 140 analyzes the average number of repeated selections of each of the images to be displayed by the display unit 110 for a week. An analysis period is not limited to one week, and as the analysis period increases, the reliability of the analyzed number of repeated selections also increases. The analysis order button (not shown) may be a kind of a non-display button.

The controller 140 generates an arrangement control signal for arranging the images to be displayed by the display unit 110 according to the analyzed numbers of repeated selections. More specifically, the arrangement control signal arranges the images to be displayed according to the analyzed numbers of repeated selections. In the aforementioned example, when it is analyzed that the numbers of repeated selections of the images a, b, c, d, e, f, g, h, and i are (3/week), (1/week), (2/week), (4/week), (0/week), (0/week), (10/week), (60/week), and (40/week), respectively, the arrangement control signal instructs the images a to i to be arranged in order of h, i, g, d, a, c, b, e, and f.

The controller 140 which generates the arrangement control signal outputs the generated arrangement control signal along with the display control signal and the read image data to the display unit 110.

Accordingly, the display unit 110 operates in response to both the display control signal and the arrangement control signal. Arrangement information is included in both the display control signal and the arrangement control signal. However, the display unit 110 may use the arrangement information included in the arrangement control signal and ignore the arrangement information included in the display control signal.

More specifically, the display unit 110 displays the plurality of the images to be displayed according to the display control signal while arranging a plurality of the images corresponding to the read image data, that is, a plurality of the images to be displayed by the display unit 110 according to the arrangement control signal.

When the controller 140 generates the arrangement control signal, the generated arrangement control signal may be stored in or outside the terminal. For this, the terminal according to the embodiment of the present invention may include an arrangement information storage unit 160.

The arrangement information storage unit 160 stores information on the generated arrangement control signal. In this case, the controller 140 may read information stored in the arrangement information storage unit 160 and output an arrangement control signal in the read information to the display unit 110.

Figure 2A:
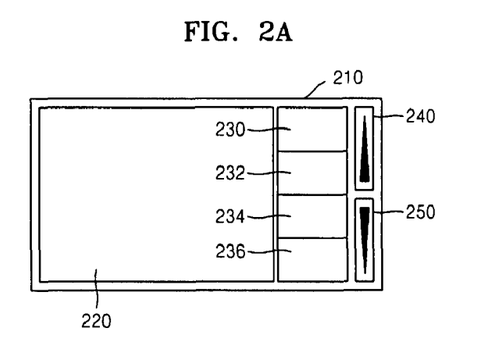
FIGS. 2A to 2C are reference views for explaining a terminal and a display method used in the terminal according to an embodiment of the present invention.
Figure 2B:
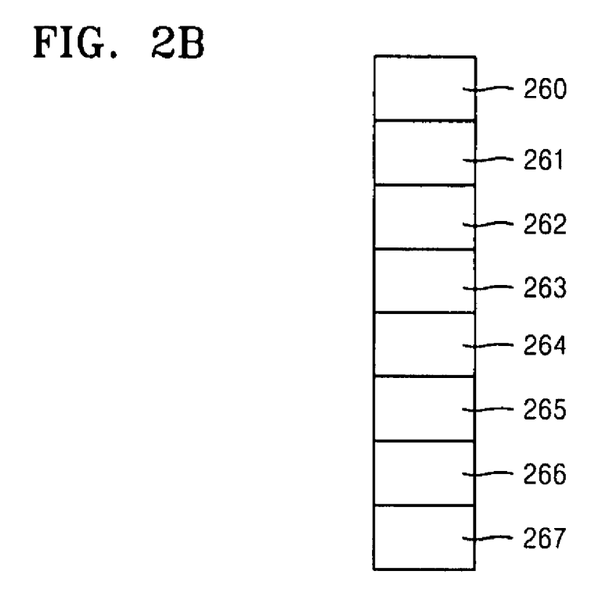
Figure 2C:
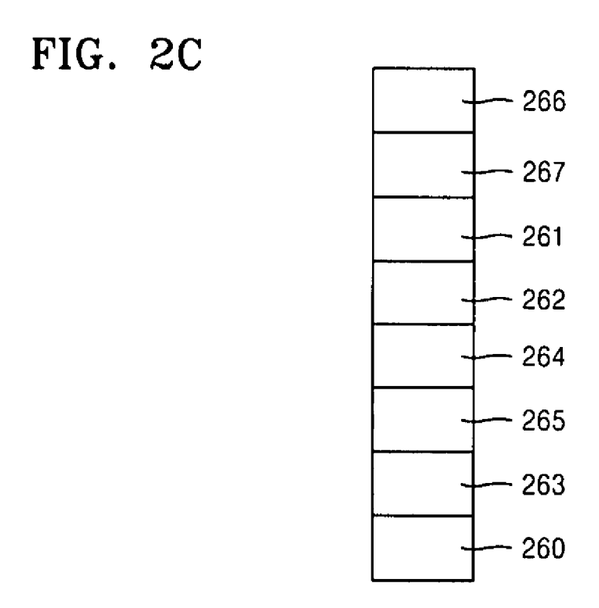

FIGS. 2A to 2C are reference views for explaining a terminal and a display method used in the terminal according to an embodiment of the present invention.

Referring to FIGS. 2A to 2C, a reference numeral 220 denotes an example of the main display unit 120 shown in FIG. 1, and reference numerals 230 to 236 denote an example of the sub display unit 130 shown in FIG. 1. In addition, N=4, and the number of simultaneously displayable images is 5.

In addition, reference numerals 260 to 267 denote a plurality of images to be displayed by the sub display units 230 to 236. Hereinafter, contents of the images denoted by the reference numerals 260 to 267 may vary. However, it is assumed that the number of images to be displayed is 8 for the convenience of description.

FIG. 2B shows the plurality of images to be displayed by the sub display units 230 to 236 arranged according to the arrangement information included in the display control signal. FIG. 2C shows the plurality of images to be displayed by the sub display units 230 to 236 arranged according to the arrangement information included in the arrangement control signal.

For the convenience of description, it is assumed that the terminal 210 has a call function, a short message service function, a record function, a music reproduction function, a picture taking function, a picture reproduction function, a motion picture taking function, a motion picture reproducing function, and an Internet function. The terminal 210 can simultaneously perform a plurality of functions.

According to an embodiment of the present invention, the main display unit 220 and the sub display units 230 to 236 display a plurality of images included in the same level.

More specifically, when the terminal 210 is performing a function, the main display unit 220 may display images showing the function which is being performed, and the sub display unit 230 to 236 may display images showing 'functions that can be performed', that is, 'functions that can be performed simultaneously with the function which is being performed'.

For example, when the terminal 210 performs the music reproduction function, the main display unit 220 needs to display information on a music file which is currently played, and the first to fourth display buttons 230 to 236 need to display 8 images including an image 260 showing the call function, an image 261 showing the short message service function, an image 262 showing the record function, an image 263 showing the picture taking function, an image 264 showing the picture reproduction function, an image 265 showing the motion picture taking function, an image 266 showing the motion picture reproduction function, and an image 267 showing the Internal retrieval function.

In this case, the main display unit 220 displays the information on the music file that is currently played, and since the maximum number of images which can be simultaneously displayed is 4, the first to fourth display buttons 230 to 236 displays four images of the 8 images 260 to 267 arranged according to the arrangement information. Specifically, the first to fourth display buttons 230 to 236 firstly display the image 260 showing the call function, the image 261 showing the short message service function, the image 262 showing the record function, and the image 263 showing the picture taking function. Here, when the user momentarily presses a down direction key 250 once, the first to fourth display buttons 230 to 236 displays the image 261 showing the short message service function, the image 262 showing the record function, the image 263 showing the picture taking function, and the image 264 showing the picture reproduction function. When the user momentarily presses the down direction key 250 once more, the first to fourth display buttons 230 to 236 display the image 262 showing the record function, the image 263 showing the picture taking function, and the image 264 showing the picture reproduction function, and the image 265 showing the motion picture taking function. According to this manner, in order for the first to fourth display buttons 230 to 236 which currently display the image 260 showing the call function, the image 261 showing the short message service function, the image 262 showing the record function, and the image 263 showing the picture taking function, to display the image 264 showing the picture reproduction function, the image 265 showing the motion picture taking function, the image 266 showing the motion picture reproduction function, and the image 267 showing the Internal retrieval function, the user have to momentarily press the down direction key 250 four times. This button input system is based on the arrangement information included in the display control signal.

A user who mainly makes a call or uses a short message service by using the terminal 210 may not feel inconvenience due to the button input system. However, a user who mainly sees motion pictures and connects to the Internet by using the terminal 210 may feel inconvenience due to the button input system. In order to solve the inconvenience, a construction for generating an arrangement control signal by the controller 140 is provided.

The controller 140 analyzes the number of repetitions of selection of each of the 8 images 260 to 267 and generates the arrangement control signal used to rearrange the 8 images according to the analyzed numbers of repeated selections. When the numbers of repeated selections of the 8 images 260 to 267 are 5/week, 60/week, 40/week, 10/week, 20/week, 20/week, 100/week, and 70/week (here, an analysis period is not limited to a week), respectively, the first to fourth display buttons 230 to 236 need to display the 8 images 260 to 267 while arranging the 8 images as shown in FIG. 2C.

In this case, the first to fourth display buttons 230 to 236 firstly display the images 266 showing the motion picture reproduction function, the image 267 showing the Internet function, and the image 261 showing the short message service function. When the user momentarily presses the down direction key 250 once, the first to fourth display buttons 230 to 236 display the image 267 showing the Internet function, the image 267 showing the short message service function, and the image 262 showing the record function. When the user momentarily presses the down direction key 250 once more, the first to fourth display buttons 230 to 236 display the image 261 showing the short message service function, the image 262 showing the record function, and the image 264 showing the picture reproduction function. According to this manner, the first to fourth display buttons 230 to 236 can display the image 265 showing the motion picture taking function, the image 263 showing the picture taking function, and the image 260 showing the call function.

The terminal 210 may simultaneously perform a plurality of the functions. In the aforementioned example, when the user wants to see pictures stored in the terminal 210 while a music file is being reproduced, the user manipulates the up direction key 240 or the down direction key 250 properly so as to allow one of the first to fourth display buttons 230 to 236 to display the image 264 showing the picture reproduction function, and the user then selects the image 264 showing the picture reproduction function. In this case, the main display unit 220 displays information on the music file that is currently reproduced, and the first to fourth display buttons 230 to 236 display four pictures from among pictures to be displayed. When the first to fourth display buttons 230 to 236 need to display 8 pictures including pictures a to h 260 to 267, the first to fourth display buttons 230 to 236 arrange the 8 pictures 260 to 267 as shown in FIG. 2B and display 4 pictures of the 8 pictures. When the controller 140 generates an arrangement control signal for arranging the 8 pictures 260 to 267 as shown in FIG. 2C, the first to fourth display buttons 230 to 237 display 4 pictures from among the 8 pictures 260 to 267 arranged as shown in FIG. 2C.

According to another embodiment of the present invention, a plurality of images displayed by the main display unit 220 and the sub display units 230 to 236 belong to a plurality of levels. Specifically, the sub display unit 230 to 236 may display images included in a sub-level of a level to which an image displayed by the main display unit 220 belongs. More specifically, the main display unit 220 displays an image showing a function that the terminal currently performs and the sub display units 230 to 236 may display 'images showing sub-functions of the function that is currently performed' and 'an image for changing a level'. Here, when the image for changing a level is selected, the sub display units 230 to 236 display images included in the same level as that of the image displayed by the main display unit 220.

For example, when the terminal 210 performs the picture taking function, the main display unit 220 needs to display an image shown through a lens (not shown) provided to the terminal 210, the first to third display buttons 230 to 234 need to display a numeral 260 showing the remaining battery capacity of the terminal 210, a numeral 261 showing the remaining memory capacity of the terminal 210, a numeral 262 showing the number of pictures stored in the terminal 210, a letter 263 for setting a shutter speed, a letter 264 for setting zoom-in, a letter 265 for setting zoom-out, a letter 266 for setting flash on/off, and a letter 267 for setting a resolution of a picture to be taken, and the fourth display button 236 needs to display the image for changing a level.

In this case, the main display unit 220 displays the image, the fourth display button 236 displays the image for changing a level, and since the maximum number of simultaneously displayable images is 3, the first to third display buttons 230 to 234 display three images of the 8 images 260 to 267 arranged according to the arrangement information. Specifically, the first to third display buttons 230 to 234 firstly display the numeral 260 showing the remaining battery capacity of the terminal 210, the numeral 261 showing the remaining memory capacity of the terminal 210, and the numeral 262 showing the number of pictures stored in the terminal 210. When the user momentarily presses the down direction key 250 once, the first to third display buttons 230 to 234 display the numeral 261 showing the remaining memory capacity of the terminal 210, the numeral 262 showing the number of pictures stored in the terminal 210, and the letter 263 for setting a shutter speed. When the user momentarily presses the down direction key 250 once more, the first to third display buttons 230 to 234 display the numeral 262 showing the number of pictures stored in the terminal 210, the letter 263 for setting a shutter speed, and the letter 264 for setting zoom-in. According to this manner, in order for the first to third display buttons 230 to 234 which currently display the numeral 260 showing the remaining battery capacity of the terminal 210, the numeral 261 showing the remaining memory capacity of the terminal 210, and the numeral 262 showing the number of pictures stored in the terminal 210 to display the letter 265 for setting zoom-out, the letter 266 for setting flash on/off, and the letter 267 for setting a resolution of a picture to be taken, the user has to momentarily press the down direction key 250 five times. This button input system is based on the arrangement information included in the display control signal.

The user who sets the flash on/off and the resolution of a picture whenever taking the picture may feel inconvenience due to the button input system. In order to solve the inconvenience, a construction of generating the arrangement control signal by the controller 140 is proposed.

The controller 140 analyzes the number of repeated selections of each of the 8 images 260 to 267 and generates the arrangement control signal used to rearrange the 8 images according to the analyzed numbers of repeated selections. When the numbers of repeated selections of the 8 images 260 to 267 are, as shown in the above embodiment, 5/week, 60/week, 40/week, 10/week, 20/week, 20/week, 100/week, and 70/week (here, an analysis period is not limited to a week), respectively, the first to third display buttons 230 to 234 need to display the 8 images 260 to 267 while arranging the 8 images as shown in FIG. 2C.

In this case, the first to third display buttons 230 to 234 firstly display the letter 266 for setting flash on/off, the letter 267 for setting the resolution of the picture to be taken, and the numeral 261 showing the remaining memory capacity of the terminal 210. Here, when the user momentarily presses the down direction key 250 once, the first to third display buttons 230 to 234 display the letter 267 for setting the resolution of the picture to be taken, the numeral 261 showing the remaining memory capacity of the terminal 210, and the numeral 262 showing the number of pictures stored in the terminal 210. When the user momentarily presses the down direction key 250 once more, the first to third display buttons 230 to 234 display the numeral 261 showing the remaining memory capacity of the terminal 210, the numeral 262 showing the number of pictures stored in the terminal 210, and the letter 264 for setting zoom-in. In this manner, the first to third display buttons 230 to 234 can display the letter 265 for setting zoom-out, the letter 263 for setting the shutter speed, and the numeral 260 showing the remaining battery capacity of the terminal 210.

Accordingly, when the user wants to set the flash on/off, the user need not manipulate the up or down direction key 240 or 250 but manipulates the first display button 230 (that is, selects the letter 266 for setting the flash on/off) to set the flash on/off. Here, whenever the user manipulates the first display button 230, the flash on/off is set while toggling. That is, when the flash is set on, if the user manipulates the first display button 230, the flash is set off. On the other hand, when the flash is set off, if the user manipulates the first display button 230, the flash is set on.

When the user wants to perform another function besides the picture taking function by using the terminal 210 and wants to know functions of the terminal 210 besides the picture taking function, the user can manipulate the fourth display button 236 (that is, can select the image for changing a level). As described above, when the image for changing a level is selected, the first to fourth display buttons 230 to 236 need to display the image 260 showing the call function, the image 261 showing the short message service function, the image 262 showing the record function, and the image 263 showing the picture taking function, the image 264 showing the picture reproduction function, the image 265 showing the motion picture taking function, the image 266 showing the motion picture reproduction function, and the image 267 showing the Internal retrieval function. The first to fourth display buttons 230 to 236 which operate in response only to the display control signal display four images of the 8 images while arranging the 8 images 260 to 267 according to the arrangement information set as default information. Similarly, the first to fourth display buttons 230 to 236 which operate in response to both the display control signal and the arrangement control signal display four images of the 8 images while arranging the 8 images 260 to 267 according to the arrangement information of the arrangement control signal.

Figure 3A:
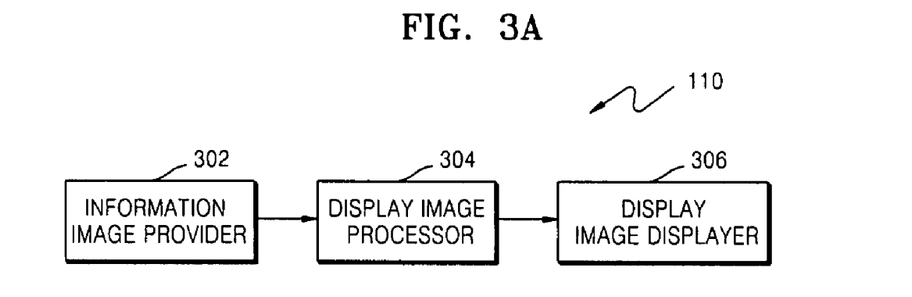
FIG. 3A is a block diagram for explaining a display unit 110 shown in FIG. 1.

FIG. 3A is a block diagram for explaining the display unit 110 shown in FIG. 1. The display unit 110 includes an information image provider 302, a display image processor 304, and a display image displayer 306.

As described above, the controller 140 reads image data corresponding to 'a result of manipulating buttons' from the image data stored in the image storage unit 150. In this case, a plurality of images corresponding to the read image data includes a plurality of information images. The information images mean images displayed by the display buttons 130-1 to 130-N.

The information image provider 302 receives the read image data and an arrangement control signal from the controller 140, arranges the plurality of the information images corresponding to the read image data according to arrangement information included in the received arrangement control signal, and outputs the arranged information images to the display unit 110 (specifically, the display image processor 304 described later). Namely, the information image provider 302 arranges the plurality of the information images in consideration of the analyzed number of repeated selections of each of the information images and outputs plurality of the information images to the display image processor 304.

The display image processor 304 generates display images by using the information images input from the information image provider 302. The display images mean a plurality of images to be displayed by the display unit 110. Specifically, the display image processor 304 may generate the display images by synthesizing the plurality of the information images input from the information image provider 302 with an image to be displayed by the main display unit 120.

The display image displayer 306 receives the display images from the display image processor 304 and displays the display images. The controller 140 controls one or more operations of the information image provider 302, the display image processor 304, and the display image displayer 306.

Figure 3B:
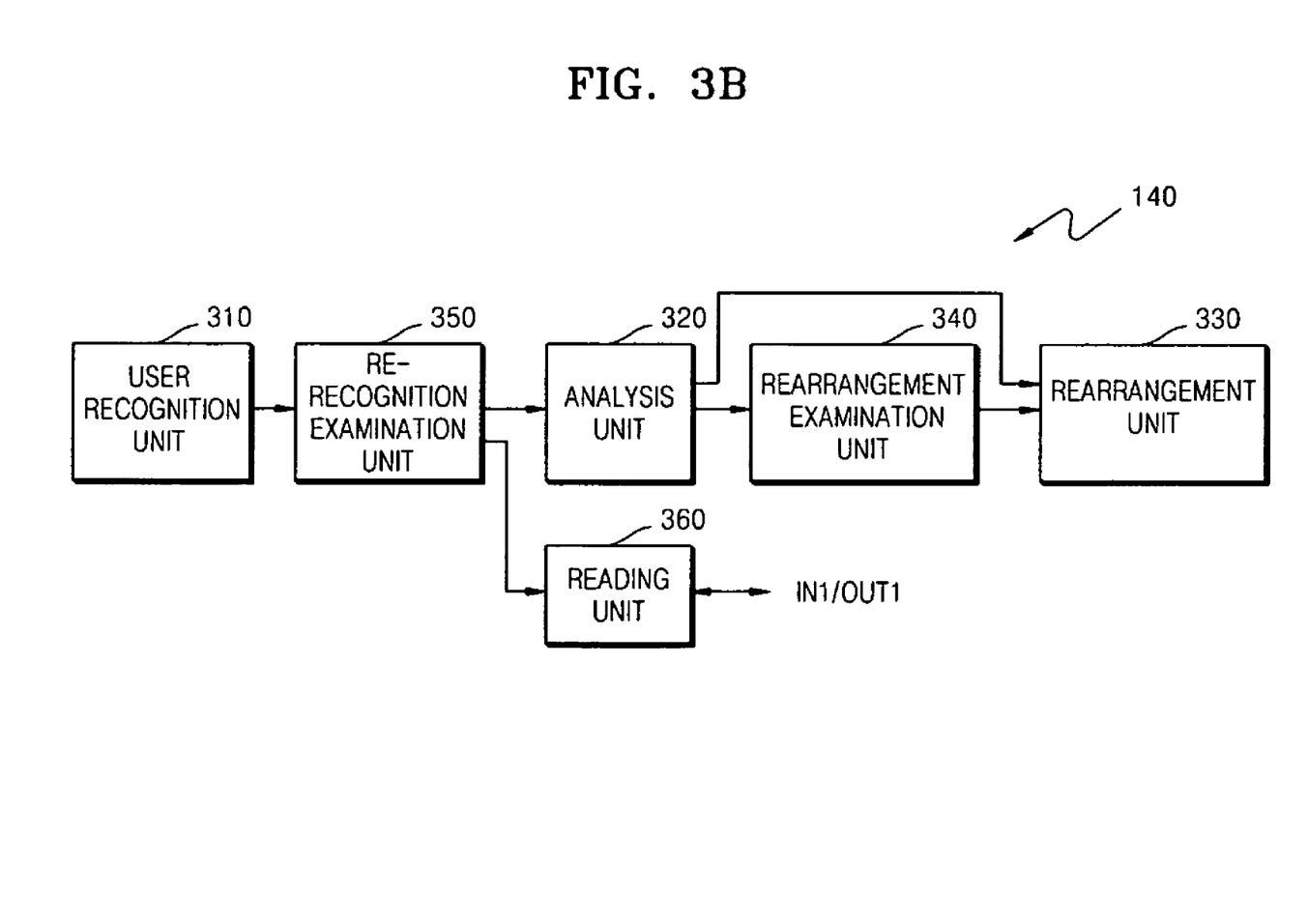
FIG. 3B is a block diagram for explaining a controller 140 shown in FIG. 1.

FIG. 3B is a block diagram for explaining the controller 140 shown in FIG. 1. The controller 140 includes a user recognition unit 310, an analysis unit 320, a rearrangement unit 330, a rearrangement examination unit 340, a re-recognition examination unit 350, and a reading unit 360.

The user recognition unit 310 recognizes a user who uses the terminal 210. To do this, the terminal 210 may store user identification information such as a user identification (ID). In this case, when the user inputs the user identification information to the terminal 210, the user recognition unit 310 recognizes that a user matching the input user identification information uses the terminal 210.

The analysis unit 320 analyzes that how many times the user selects each of the images to be displayed by the display unit 110 for a predetermined period. As described above, the operations of the analysis unit 320 are started or ended by manipulating the analysis order button (not shown) of the terminal 210.

The rearrangement unit 330 generates the arrangement control signal for arranging the plurality of the images to be displayed by the display unit 110 according to the analyzed numbers of repeated selections.

The rearrangement examination unit 340 examines whether a ratio of images each of which having the analyzed number of repeated selections equal to or greater than a predetermined critical value to the plurality of the images to be displayed by the display unit 110 is a predetermined ratio.

For example, when the plurality of the images to be displayed by the display unit 110 are images a to i, the numbers of repeated selections analyzed for a week are (3/week), (1/week), (2/week), (4/week), (0/week), (0/week), (10/week), (60/week), and (4/week), respectively, the critical value is (5/week), and the predetermined ratio is in a range of from more than 0% to less than 30%, the rearrangement examination unit 340 examines that a ratio of the images g and h which have the analyzed numbers of repeated selections equal to or greater than the predetermined critical value to the plurality of the images a to i to be displayed by the display unit 110, that is, 2/8=26%, is in a range of from more than 0% to less than 30%. The rearrangement unit 330 operates only when the ratio is equal to the predetermined ratio. The reason that the predetermined ratio is required to be more than 0% is that if an image which is mainly selected by a user from among the plurality of the images to be displayed by the display unit 110 does not exist, it is impossible to select it. Similarly, the reason that the predetermined ratio is required to be less than 30% is that when most of the images (specifically, more than 30%) to be displayed by the display unit 110 are the image mainly selected by the user (specifically, images having the number of repeated selections equal to or greater than the predetermined critical value ), although the display unit 110 changes the existing arrangement according to the arrangement information included in the arrangement control signal, the utility of the change is small. The aforementioned values of 0% and 30% are used for the convenience of description and may vary.

As described above, when the rearrangement unit 330 generates the arrangement control signal, information on the generated arrangement control signal is matched to information on the recognized user and stored in the arrangement information storage unit 160.

When it is assumed that an arrangement control signal matched to the recognized user (for example, a user A) was generated and stored, another user (for example, a user B) used the terminal 210, and currently the user A uses the terminal 210, the user recognition unit 310 recognizes that a user who currently uses the terminal 210 is the user A. In this case, when the analysis unit 320 and the rearrangement unit 330 operate again, the analysis unit 320 and the rearrangement unit 330 generate the already generated arrangement control signal again. Therefore, in order to prevent this situation, the terminal 210 according to the current embodiment of the present invention includes the re-recognition examination unit 350 and the reading unit 360.

The re-recognition examination unit 350 examines whether the currently recognized user was recognized in advance. When the user was recognized in advance, the information on the arrangement control signal matched to the recognized user is already stored in the arrangement information storage unit 160, so that the reading unit 360 reads the stored information from the arrangement information storage unit 160 through an input terminal IN 1 and outputs the read information through an output terminal OUT 1 to the display unit 110.

Figure 4:
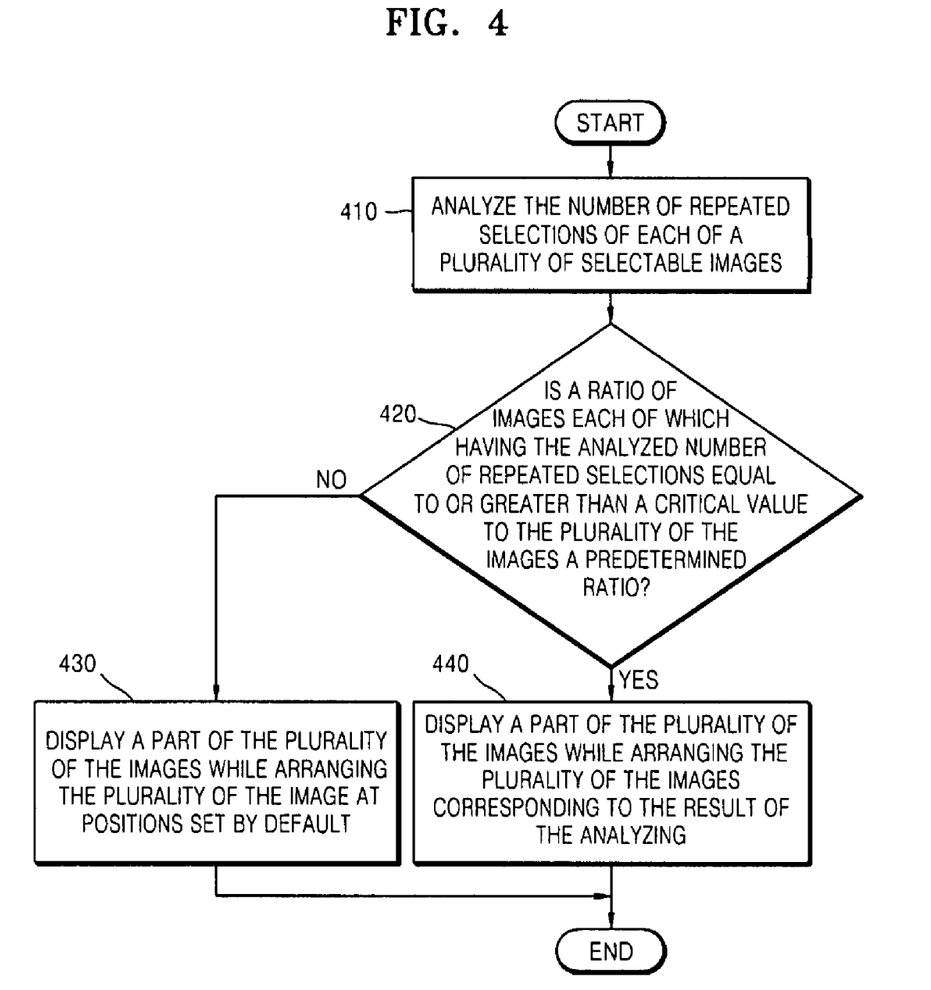
FIG. 4 is a flowchart for explaining a display method when stored arrangement information does not exist in the terminal, according to an embodiment of the present invention.

FIG. 4 is a flowchart for explaining a display method when stored arrangement information does not exist in the terminal according to an embodiment of the present invention. The display method may include operations 410 to 440 of analyzing images mainly selected by a user from among images to be displayed by the display unit 110 and firstly displaying the selected images.

The controller 140 analyzes the number of repeated selections of a plurality of the images to be displayed by the display unit 110 (operation 410), and the controller 140 determines whether or not a ratio of images having the number of repeated selections analyzed in operation 410 equal to or greater than a predetermined critical value to the plurality of the images is a predetermined ratio (operation 420).

When it is determined that the ratio is not the predetermined ratio in operation 420, the display unit 110 displays a part of the plurality of the images while arranging the plurality of the images according to arrangement information set as default information (operation 430).

On the contrary, when it is determined that the ratio is the predetermined ratio, the controller 140 provides an arrangement control signal to the display unit 110 in consideration of the number of repeated selections analyzed in operation 410, and the display unit 110 displays a part of the plurality of the images while arranging the plurality of the images according to arrangement information included in the arrangement control signal (operation 440).

The display method according to the current embodiment of the present invention may not include operations 420 and 430.

Figure 5:
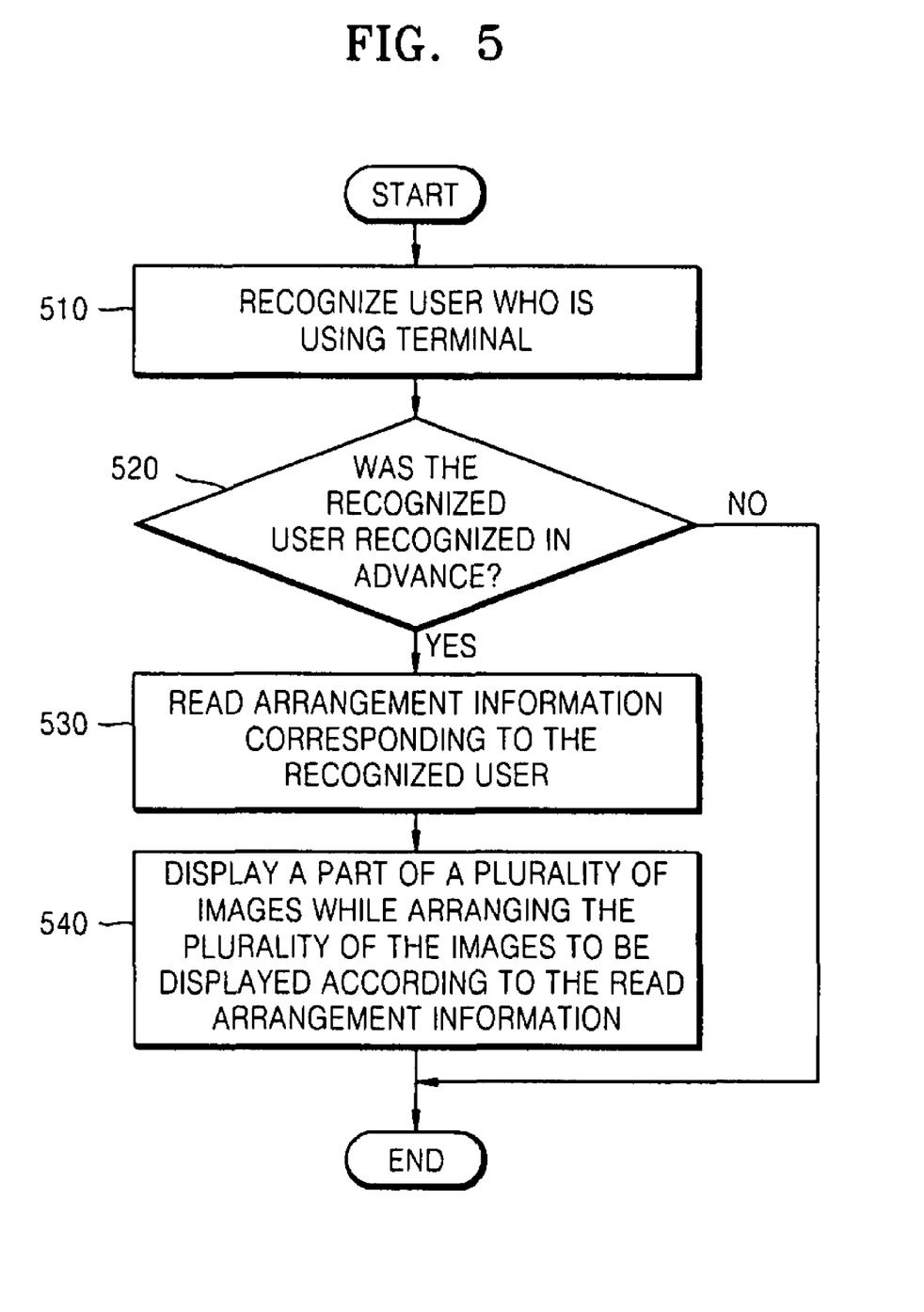
FIG. 5 is a flowchart for explaining a display method when stored arrangement information exists in the terminal, according to an embodiment of the present invention.

FIG. 5 is a flowchart for explaining a display method when stored arrangement information exists in the terminal according to an embodiment of the present invention. The display method may include operations 510 to 540 of analyzing images mainly selected by the user from among images to be displayed by the display unit 110 and firstly displaying the selected images.

The controller 140 recognizes the user who is using the terminal 210 (operation 510), and the controller 140 determines whether or not the user recognized in operation 510 was recognized in advance by the terminal 210 (operation 520).

When it is determined that the user was recognized in advance, the controller 140 reads information on an arrangement control signal matched to the user recognized in operation 510 from the arrangement information storage unit 160 (operation 530), and the display unit 110 displays a part of a plurality of images while arranging the plurality of the images to be displayed by the user 110 according to arrangement information included in the information read in operation 530 (operation 540).

As described above, the terminal and the display method used in the terminal according to the present invention analyze images which are mainly selected by a user from among images to be displayed and display the selected images firstly, although the terminal needs to display more images than the maximum number of images which the terminal can simultaneously display. Therefore, there is an advantage in that the user who wants to select an image does not have to perform a time-consuming task such as scrolling. Accordingly, an average time consumed to select an image from among the images to be displayed can be reduced.

In addition, the images mainly selected by a user are analyzed according to the terminal users, so that an optical interface can be provided according to the users.

Part of the plurality of the images may be displayed through a plurality of buttons provided to the terminal, and other part of the images may be displayed through the main display unit provided to the terminal. In this case, a plurality of images showing a plurality of functions that the terminal is simultaneously performing are displayed by the buttons along with the main display unit, so that the user intuitively recognizes the functions which the terminal simultaneously performs.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A terminal having a plurality of display buttons for displaying a plurality of information images included in a display image, the terminal comprising:
    an information image provider to output each of the plurality of information images to a display image processor;
    the display image processor to generate the display image, the display image comprising information images to be displayed in a sub display unit which is comprised of the plurality of display buttons and an image to be displayed in a main display unit, by synthesizing the plurality of information images input from the information image provider with the image to be displayed in the main display unit, wherein the number of information images to be displayed in the sub display unit is more than the number of display buttons, and the information images which are more repeatedly selected by a user among the information images to be displayed in the sub display unit are firstly displayed on the display buttons according to the analyzed number of repeated selections of each of the information images;
    a display image displayer to receive the display image from the display image processor and display the display image, the display image displayer including the main display unit and the sub display unit comprised of the plurality of display buttons, the main display unit comprising a first region of the display image displayer where the main display unit displays the image to be displayed in the main display unit, the sub display unit comprising a second region of the display image displayer where the sub display unit displays the plurality of information images, the first region being larger than the second region; and
    a controller to control one or more operations of the information image provider, the display image processor, and the display image displayer,
    wherein the image to be displayed in the main display unit shows a function that the terminal is performing, and the information images show sub-functions of the function that the terminal is performing.

2. The terminal of claim 1, wherein, when the display button displaying an image for changing a level is manipulated, the information image is renewed as an image showing a function that the terminal can perform.

3. A terminal comprising:
    a display unit including a plurality of buttons arranging a plurality of selectable images in response to an arrangement control signal and displaying at least a part of the plurality of selectable images, the display unit including a main display unit and a sub display unit comprised of the plurality of display buttons, the main display unit comprising a first region of the display unit where the main display unit displays an image to be displayed in the main display unit, the sub display unit comprising a second region of the display unit where the sub display unit displays the plurality of selectable images, the first region being larger than the second region; and
    a controller generating the arrangement control signal for arranging the plurality of selectable images, wherein the number of the selectable images to be displayed in the sub display unit is more than the number of display buttons, and the selectable images which are more repeatedly selected by a user among the selectable images to be displayed in the sub display unit are firstly displayed on the display buttons according to the analyzed number of repeated selections of each of the selectable images, and
    wherein the image to be displayed in the main display unit shows a function that the terminal is performing, and the plurality of selectable images show sub-functions of the function that the terminal is performing.

4. The terminal of claim 3, wherein the arrangement control signal is used to arrange the plurality of selectable images according to the increasing order of the analyzed numbers of repeated selections.

5. The terminal of claim 3, wherein the controller comprises:
    an analysis unit analyzing the number of repeated selections of each of the plurality of selectable images;
    a rearrangement examination unit examining whether or not a ratio of images each of which having the analyzed number of repeated selections equal to or greater than a critical value to the plurality of selectable images is a predetermined ratio; and
    a rearrangement unit generating the arrangement control signal corresponding to the analyzed result in response to the result of the examining.

6. The terminal of claim 3, the number of the levels to which at least the part of the plurality of selectable images belong is at least one.

7. The terminal of claim 3, wherein the terminal further comprises an arrangement information storage unit storing information on the generated arrangement control signal,
wherein the controller reads the stored information and outputs the arrangement control signal represented in the read information to the display unit.

8. The terminal of claim 3, further comprising an arrangement information storage unit storing information on the generated arrangement control signal for each of the users recognized by the terminal,
wherein the controller comprises:
a user recognition unit recognizing a user who is using the terminal;
a re-recognition examination unit examining whether the most recently recognized user was recognized in advance; and
a reading unit reading information corresponding to the most recently recognized user in response to the result of the examining from the arrangement information storage unit and outputting the arrangement control signal represented in the read information to the display unit.

9. The terminal of claim 8, wherein the controller further comprises:
an analysis unit analyzing the number of repeated selections of each of the plurality of the images by the most recently recognized user in response to the result of the examining;
a rearrangement unit generating the arrangement control signal of the most recently recognized user by using the result of the analyzing.

10. The terminal of claim 3, wherein at least of the part of the plurality of selectable images shows a plurality of functions that the terminal simultaneously performs.

11. A display method used for a plurality of display buttons for displaying a plurality of information images included in a display image, the display method comprising:
arranging the plurality of information images in consideration of the analyzed number of repeated selections of each of the information images;
generating the display image, the display image comprising information images to be displayed in a sub display unit which is comprised of the plurality of display buttons and an image to be displayed in a main display unit, by synthesizing the plurality of information images with the image to be displayed in the main display unit, wherein the number of information images to be displayed in the sub display unit is more than the number of display buttons, and the information images which are more repeatedly selected by a user among the information images to be displayed in the sub display unit are firstly displayed on the display buttons according to the analyzed number of repeated selections of each of the information images; and
displaying the display image, the display image is displayed on the main display unit and the sub display unit comprised of the plurality of display buttons, the main display unit comprising a first region of the display image displayer where the main display unit displays the image to be displayed in the main display unit, the sub display unit comprising a second region of the display image displayer where the sub display unit displays the plurality of information images, the first region being larger than the second region,
wherein the image to be displayed in the main display unit shows a function that a terminal is performing, and the information images show sub-functions of the function that the terminal is performing.

12. The display method of claim 11, wherein, when the display buttons displaying an image for changing a level is manipulated, the information image is renewed as an image showing the function that the terminal can perform.

* * * * *

UNITED STATES PATENT AND TRADEMARK OFFICE
CERTIFICATE OF CORRECTION

PATENT NO. : 8,213,996 B2  
APPLICATION NO. : 11/892534  
DATED : July 3, 2012  
INVENTOR(S) : Jung-hyun Shim et al.

Page 1 of 1

It is certified that error appears in the above-identified patent and that said Letters Patent is hereby corrected as shown below:

Column 15, Line 36, In Claim 10, after "least" delete "of".

Signed and Sealed this
Twentieth Day of November, 2012

David J. Kappos
*Director of the United States Patent and Trademark Office*